(12) United States Patent
Baun et al.

(10) Patent No.: US 10,352,306 B2
(45) Date of Patent: Jul. 16, 2019

(54) WIND TURBINE NACELLE

(71) Applicant: Vestas Wind Systems A/S, Aarhus N. (DK)

(72) Inventors: Torben Ladegaard Baun, Skødstrup (DK); Henrik Kudsk, Harlev J (DK); Klaus Lynge Petersen, Skjern (DK); Jesper Lykkegaard Neubauer, Hornslet (DK)

(73) Assignee: Vestas Wind Systems A/S, Aarhus N. (DK)

( * ) Notice: Subject to any disclaimer, the term of this patent is extended or adjusted under 35 U.S.C. 154(b) by 235 days.

(21) Appl. No.: 15/540,278

(22) PCT Filed: Jan. 21, 2016

(86) PCT No.: PCT/DK2016/050017
§ 371 (c)(1),
(2) Date: Jun. 28, 2017

(87) PCT Pub. No.: WO2016/116112
PCT Pub. Date: Jul. 28, 2016

(65) Prior Publication Data
US 2017/0363071 A1    Dec. 21, 2017

(30) Foreign Application Priority Data
Jan. 22, 2015  (DK) .................................. 2015 70041

(51) Int. Cl.
*F03D 11/04* (2006.01)
*F03D 13/40* (2016.01)
(Continued)

(52) U.S. Cl.
CPC ............. *F03D 13/40* (2016.05); *B65D 85/68* (2013.01); *B65D 88/129* (2013.01); *F03D 13/20* (2016.05);
(Continued)

(58) Field of Classification Search
CPC .......... F03D 13/40; F03D 13/20; F03D 15/00; F03D 80/70; F03D 80/82; F03D 80/88;
(Continued)

(56) References Cited

U.S. PATENT DOCUMENTS

| 2009/0129931 A1* | 5/2009 | Stiesdal | ................ F03D 13/10 416/204 R |
| 2010/0072835 A1* | 3/2010 | Klatt | ........................ H02K 5/00 310/54 |

(Continued)

FOREIGN PATENT DOCUMENTS

| CN | 102506064 A | 6/2012 |
| CN | 103635713 A | 3/2014 |

(Continued)

OTHER PUBLICATIONS

China National Intellectual Property Administration, First Notification of Office Action in CN Application No. 201680006500.3, dated Sep. 21, 2018.

(Continued)

*Primary Examiner* — Marguerite J McMahon
(74) *Attorney, Agent, or Firm* — Wood Herron & Evans LLP

(57) ABSTRACT

A wind turbine nacelle configured for mounting on a wind turbine tower and for supporting a rotor assembly, the nacelle comprising at least a first and a second nacelle module. The first nacelle module comprises a first frame structure and a main bearing system for a main shaft of the rotor assembly, and the second nacelle module comprises a second frame structure and a drive train system for the wind turbine. When the nacelle is mounted on the wind turbine tower, the main bearing system is supported by the wind turbine tower, and the drive train system is attached to the main bearing such that the weight of the drive train system is transferred to the main bearing system and thereby to the (Continued)

wind turbine tower. Further, the first frame structure is configured to support the main bearing system during transportation and prior to mounting of the nacelle, and the second frame structure is configured to support the drive train system during transportation and prior to mounting of the nacelle, and the first and second frame structures form a load carrying structure of a first and a second shipping freight container such that the first and second nacelle module can be transported as shipping freight containers. When the nacelle is mounted on the wind turbine tower, the first and second frame structures may be placed side by side in a direction along a rotational axis of the wind turbine rotor and may be oriented such as to have a length extending transversely to a rotational axis of the wind turbine rotor.

18 Claims, 4 Drawing Sheets

(51) Int. Cl.

| | | |
|---|---|---|
| *F03D 80/80* | (2016.01) | |
| *F03D 13/20* | (2016.01) | |
| *F03D 15/00* | (2016.01) | |
| *F03D 80/70* | (2016.01) | |
| *B65D 85/68* | (2006.01) | |
| *B65D 88/12* | (2006.01) | |

(52) U.S. Cl.
CPC ............. *F03D 15/00* (2016.05); *F03D 80/70* (2016.05); *F03D 80/82* (2016.05); *F03D 80/88* (2016.05); *B65D 2585/6877* (2013.01); *F05B 2230/60* (2013.01); *F05B 2240/142* (2013.01); *F05B 2240/912* (2013.01); *Y02E 10/726* (2013.01); *Y02P 70/523* (2015.11)

(58) Field of Classification Search
CPC ...... F03D 1/0641; F03D 1/091; F03D 1/0625; F03D 13/10; B65D 85/68; B65D 88/129; B65D 2585/6877; Y02P 70/523; F05B 2230/60; F05B 2240/923; F05B 2240/142; Y02E 10/726

USPC ...................................................... 416/170 R
See application file for complete search history.

(56) References Cited

U.S. PATENT DOCUMENTS

| | | | |
|---|---|---|---|
| 2013/0011272 A1* | 1/2013 | Mortensen | ............... F03D 80/60 416/244 R |
| 2017/0175717 A1* | 6/2017 | Saenz De Ugarte Sevilla | ............ F03D 13/20 |

FOREIGN PATENT DOCUMENTS

| | | |
|---|---|---|
| CN | 103703246 A | 4/2014 |
| CN | 107208609 A | 9/2017 |
| EP | 1134410 A1 | 9/2001 |
| EP | 2014912 A2 | 1/2009 |
| EP | 2063119 A2 | 5/2009 |
| EP | 2161445 A1 | 3/2010 |
| GB | 2476462 A | 6/2011 |
| KR | 100752510 B1 | 8/2007 |

OTHER PUBLICATIONS

H. Stiesdal, The Bonue 750 KW Wind Turbine, European Union Wind Energy Conference, May 20, 1996, pp. 215-218.
European Patent Office, International Search Report and Written Opinion in PCT/DK2016/050017, dated Mar. 30, 2017.
Danish Patent and Trademark Office, Search Report in PA 2015 70041, dated Aug. 13, 2015.

* cited by examiner

WIND TURBINE NACELLE

FIELD OF THE INVENTION

The present invention relates to a wind turbine nacelle configured for mounting on a wind turbine tower and for supporting a rotor assembly, the nacelle comprising at least a first and a second nacelle module. The nacelle of the present invention is particularly suitable for use in large wind turbines.

BACKGROUND OF THE INVENTION

Over the past years there has been a tendency for wind turbines to increase in size, in terms of nominal power output as well as in terms of physical dimensions of the individual parts of the wind turbine. As a consequence, the size of the nacelle must also be increased in order to ensure that the nacelle is capable of accommodating the required wind turbine components.

Wind turbines are normally transported from the location or locations of manufacture of the individual parts to the operating site where the wind turbine is supposed to be erected.

Accordingly, as the size of the wind turbines, and thereby the size of the individual parts of the wind turbines, increases it becomes increasingly difficult to transport the parts to the operating site, and the dimensions of roads, transport vehicles etc. impose an upper limit to the size of parts which it is possible to transport. It is therefore desirable to be able to divide some of the larger parts of the wind turbine into smaller modules during transport of the parts to the operating site.

EP 2 063 119 discloses a module of a nacelle of a wind turbine, which is separately designed, manageable and comprises a housing part. The module is connectable to at least one further module of the nacelle, which is also separately designed, manageable and has a housing part. The housing part of the module builds in the assembled status of the nacelle, which comprises several modules, a part of the housing of the nacelle. The modules disclosed in EP 2 063 119 are connected one after another by flanges in the housing parts. This however has the consequence that the requirements to the strength of the housing part of each module become extremely high, increasing the weight of the modules which further increases the requirements to the load bearing capacity of the yawing arrangement and to the tower.

DESCRIPTION OF THE INVENTION

It is an object of embodiments of the invention to provide a nacelle for a wind turbine, the nacelle being transportable using ordinary transport means and at lower transportation and handling costs, without limiting the possible size of the nacelle or even preferably while also increasing the width of the nacelle. It is a further object of embodiments of the invention to provide a modular nacelle for a wind turbine, with reduced costs for assembly and mounting. A further object is to provide a nacelle with an improved placement of especially the more heavy wind turbine component closer to the wind turbine tower.

In accordance with the invention this is obtained by a wind turbine nacelle configured for mounting on a wind turbine tower and for supporting a rotor assembly, the nacelle comprising at least a first and a second nacelle module, the first nacelle module comprising a first frame structure and a main bearing system for a main shaft of the rotor assembly, and the second nacelle module comprising a second frame structure and a drive train system for the wind turbine. Further, when the nacelle is mounted on the wind turbine tower, the main bearing system is supported by the wind turbine tower, and the drive train system is attached to the main bearing such that the weight of the drive train system is transferred to the main bearing system and thereby to the wind turbine tower. Furthermore, the first frame structure is configured to support the main bearing system during transportation and prior to mounting of the nacelle, and the second frame structure is configured to support the drive train system during transportation and prior to mounting of the nacelle, and the first and second frame structures form a load carrying structure of a first and a second shipping freight container such that the first and second nacelle module can be transported as shipping freight containers.

In this way each nacelle module can be separately and easily transported to the site for the wind turbine. Also, the nacelle modularity allows for a wide and short supply chain compared to the relatively much narrower and long supply chain of a single piece nacelle.

As each of the frame structures forms a load carrying structure of a shipping freight container, each nacelle module inherits the advantages of shipping freight containers with respect to handling, transportation, and storage. Shipping freight containers can for example be handled anywhere in the world through specialized modes (ships, trains, trucks, barges and wagons) and equipment and at lower costs compared to bulk transport. The cost savings are even more pronounced when compared to the costs of shipping, transportation and handling of specialized and oversize elements as traditional nacelles. This applies to the full supply chain from factories, in harbours, in storage, at rail hubs etc.

Further, the trans-shipment operations are minimal and rapid for shipping freight containers, containerships are faster than regular freighter ships and port turnaround times can be reduced considerably compared to the times required for transportation of a traditional nacelle or parts hereof transported as bulk. Also, shipping freight containers can advantageously be stacked during storage and transportation yielding a simpler and less expensive packaging and limiting the required storage space.

Further, the nacelle modules which are transportable as shipping freight containers advantageously make it possible to enter sites with even a big wind turbine at remote sites with road limits.

Also, the nacelle modules advantageous allow for the nacelle to be assembled on the wind turbine tower one nacelle module at a time, which allows for the use of a smaller crane. This is similarly the case during later repair or upgrading where one or more nacelle modules can be dismantled and lowered to the ground one nacelle module at a time.

By a shipping freight container is here meant a container with strength suitable to withstand shipment, storage, and handling, and generally designed to be moved from one mode of transport to another without unloading and reloading. A shipping freight container is also referred to as an intermodal container, a standard freight container, a box container, a sea fright container, or an ISO container, and refers in general to a container used to store and move materials and products in the global containerized intermodal freight transport system for intercontinental traffic.

The first and second frame structures may comprise a bed plate and/or a number of bottom rails, a number of corner posts and/or walls, and a number of top rails connected in corner and/or edge fittings. The frame structures may further comprise a number of cross members or struts to increase the stability and the strength of the frame structure. The frame structure may further comprise side panels, roof panels, and/or floor panels. One or more of the side panels may be collapsible.

The first and second frame structures each form or constitute a load carrying structure of a shipping freight container i.e. the first and second frame structures are a box-like structure and can as such be seen to be a shipping freight container in itself in that the frame structure may provide the stiffness and strength required for the handling, transportation, and stacking of a shipping freight container. During transportation and prior to the mounting of the nacelle, a nacelle module may in addition to the frame structure comprise additional removable frame elements such as cross bars, struts, panels, transportation covers etc. Such additional frame elements may for example be added to increase the strength or stiffness of the shipping freight container or to shield or protect the content of the shipping freight container.

The frame structures may further comprise corner fittings with openings for twistlock fasteners at one or more corners. Each corner fitting may comprise one or more openings at different sides of the corner fitting allowing for attachment to one or more sides or above/below. Preferably the frame structure(s) comprises corner fittings at all eight corners in the box-like structure. The corner fittings can advantageously provide the means to lift and stack containers in a (semi-) automatic and standardized way with the help of twistlocks. The corner fittings may further be used to connect the frame structures sideways or in a stack both during storing and transportation and in connecting of the nacelle modules in the assembled nacelle.

The first and second frame structures are typically made of steel, optionally with parts in plastic or fiber reinforced materials, or plywood.

In an embodiment the frame structure may follow the dimensional and structural specifications in the ISO standard of ISO 668:2013 for series 1 freight containers.

As mentioned, the first nacelle module comprises the first frame structure and a main bearing system for a main shaft of the rotor assembly, which bearing system is supported by the wind turbine tower when the nacelle is mounted on the wind turbine tower but which is supported by the first frame structure during transportation and prior to mounting of the wind turbine nacelle. Similarly, the second nacelle module comprises the second frame structure and a drive train system for the wind turbine. When the nacelle is assembled and mounted on the wind turbine tower the drive train system is attached to the main bearing of the first nacelle module such that the weight of the drive train system is transferred to the main bearing system and thereby to the wind turbine tower. However, during transportation and prior to mounting of the nacelle, the second frame structure is configured to support the drive train system. In this way is obtained that the frame structures each support the wind turbine components placed therein and provide the strength and stiffness of each nacelle module for the transportation and handling of the modules separately, while in the assembled and mounted nacelle, the main wind turbine components of the main bearing system and the drive train system are supported by the wind turbine tower. Hereby, the frame structures can be dimensioned to provide the strength and stiffness of each nacelle module for the transportation and handling of the modules but need not be dimensioned to form the load-carrying structure of the assembled wind turbine nacelle. Thereby the weight of the frame structures can be reduced considerably which both lowers the cost of the transportation and assembly of the nacelle modules. In this way the frame structures first function as transport frames prior to assembly of the nacelle and then change function into a cover or as a frame for a cover of the assembled nacelle.

In the assembled nacelle, the first and second frame structure may be placed side-by-side, and/or joined, or detachably connected to each other.

The drive train system is attached to the main bearing system such that the weight of the drive train system and preferably also the loads during wind turbine operation are transferred to the main bearing system. Additional supports for taking up vibrations and the like may be provided between the frame structure(s) and the drive train system.

The main bearing system supported by the wind turbine tower may be directly or indirectly attached to the wind turbine tower for example via a yawing system or an intermediate part.

In the assembled nacelle, the first frame structure may further be partially or completely supported by the main bearing system and/or the second frame structure may be partially or completely supported by the drive train system. The loads and the weight of the frame structures may hereby advantageously be partially or completely transferred to and carried by the wind turbine tower via the wind turbine components.

The wind turbine component(s) such as the main bearing system and the drive train system may be supported by the frame structure or vice versa by being suspended in between some of the frame elements, by being mounted on one or more bottom rails or a bed plate, by hanging from top rails, or attached to one or more of the corner posts or walls, or combinations hereof. The wind turbine component may in one embodiment be placed in rails or placed in a suspension such as to be movable relative to the frame structure upon assembly of the nacelle. In this way the wind turbine component may be placed entirely within the volume of the frame structure during transportation and be placed partly protruding from the frame structure volume in the assembled nacelle.

The first and second frame structures of the first and second nacelle modules, respectively, may further be configured for supporting further wind turbine components such as lubrication systems, cooling systems, weather stations, converter systems, controller systems etc. The further wind turbine components may for example be mounted on flooring or otherwise attached to the frame structures.

In an embodiment, the first and second frame structures are placed side by side in a direction along a rotational axis of the wind turbine rotor, when the nacelle is mounted on the wind turbine tower. This provides for an advantageous modularity of the nacelle with the advantageous distribution of the main wind turbine components such as to have the main bearing system in the first nacelle module and the drive train system in the second nacelle module. Hereby can be obtained a clear interface between the nacelle modules and in the generic system of the wind turbine.

The first nacelle module is placed in between the rotor assembly and the second nacelle module or alternatively the second nacelle module is placed in between the rotor assembly and the first nacelle module. The positioning of the nacelle modules relative to each other depends on the type of the drive train system.

The drive train system may comprise one of a gear system, a direct drive generator, a belt drive, or a hydraulic transmission system.

In an embodiment the first and second frame structures are oriented such as to have a length extending transversely to a rotational axis of the wind turbine rotor when the nacelle is mounted on the wind turbine tower. Hereby each of the two nacelle modules have additional space on one or both sides of the main wind turbine components of the main bearing system and the drive train system which may advantageously be used for other wind turbine components. This advantageously allows for more of the wind turbine components to be placed closer to the wind turbine tower, which is especially advantageous for the more heavy components such as for example the transformer with a weight of several tons. Also, a broader nacelle is obtained without increasing the transportation cost as the nacelle modules can simply be transported 'sideways' as containers by conventional means and on roads of normal width. This orientation of the frame structures in the nacelle is further advantageous in reducing the overall length of the assembled nacelle thereby improving the stiffness of the nacelle structure as such and reducing the stiffness requirements in order to avoid critical natural frequencies of the assembled nacelle structure.

In an embodiment the first frame structure has a length, a width, and a height, and the second frame structure has the same length and height as the first frame structure, and the first frame structure and the second frame structure are placed corner to corner in the nacelle when mounted on the wind turbine tower. Hereby the first and second nacelle modules may be simply and easily be attached and connected by attaching the frame structures. Also, the frame structures placed side by side may hereby form parts of or the entire outer structure of the assembled nacelle and may advantageously be used for the covering of the assembled nacelle.

In a further embodiment, when the nacelle is mounted on the wind turbine tower, the second frame structure is attached to and supported by the first frame structure, and the first frame structure is supported by the tower. In this way the loads of the second frame system are effectively transferred to the wind turbine tower with no only relatively small additional stiffening of the first frame structure. The first and second frame structures may be simply and easily attached by means of for example corner fittings, weldings, bolts and/or other mechanical fastening means. Additionally, the first frame structure may be partially supported by the main bearing system and/or the second frame structure may be partially supported by the drive train system.

In a further embodiment, the wind turbine nacelle further comprises a third nacelle module comprising a third frame structure, which is placed side by side to the first or the second frame structure when the nacelle is mounted on the wind turbine tower. This may advantageously provide for additional space in the assembled nacelle for further wind turbine components.

The third frame structure is in one embodiment placed side by side to the second frame structure in a direction along the rotational axis of the wind turbine rotor when the nacelle is mounted on the wind turbine tower. Hereby is obtained additional space behind the drive train system.

The third frame structure is in an embodiment of the invention configured to support a generator during transportation and prior to mounting of the nacelle, which generator, when the nacelle is mounted on the wind turbine tower, is attached to the drive train system such that the weight of the generator is transferred to the drive train system and to the main bearing system and thereby to the wind turbine tower. Hereby the first and second frame structures need not be dimensioned to carry the weight of the entire third nacelle module as at least the generator weight is carried by drive train system and the man bearing system. On the same time the third frame structure supports the generator during the transportation and thereby provides for the safety and the handling of the generator during transportation. The third frame structure in an embodiment forms a load carrying structure of a shipping freight container such that the third nacelle module can be transported as shipping freight container. The advantages hereof are as mentioned in relation to the first and second nacelle modules.

In an embodiment of the invention, the third frame structure has a length smaller than the length of the first or the second frame structures. Hereby the overall size of the assembled nacelle can be reduced to what is needed to accommodate the different wind turbine components.

In a further embodiment of the invention, the first nacelle module further comprises at least a part of a yawing arrangement which is supported by the first frame structure during transportation and prior to mounting of the nacelle, and where the yawing arrangement part is supported by the wind turbine tower when the nacelle is mounted on the wind turbine tower. The first nacelle module may comprise the entire yawing arrangement depending on the size of the nacelle module. If the yawing arrangement has a diameter greater than the width of the first nacelle module, the yawing arrangement may be assembled from more parts. The first nacelle module is preferably placed symmetrically on the yawing arrangement either about its length direction or about its width direction or both to reduce the bending moments in the tower from the nacelle. The first nacelle module may in an embodiment be placed on the yawing arrangement such as to thereby aid in increasing the distance between the tips of the wind turbine blades and the wind turbine tower during operation. I.e. the first nacelle module may be placed as far forward in the direction of the wind as possible.

In an embodiment the first nacelle module further comprises a bed plate which is supported by the first frame structure during transportation and prior to mounting of the nacelle, and where the bed plate is supported by the wind turbine tower when the nacelle is mounted on the wind turbine tower. Hereby is provided a means for the placing of other wind turbine components in the nacelle module in a way which does not increase the requirements to the dimensioning of the frame structure. Further is hereby provided flooring for persons working in the nacelle. The first nacelle module in one embodiment comprises further wind turbine components such as a lubrication system, transformer, and/or a control system mounted on the bed plate which provides for an effective support of the further often quite heavy wind turbine components both during transportation and in the assembled nacelle advantageously relatively close to the wind turbine tower.

In yet a further embodiment of the invention, the drive train system is resiliently suspended in the second frame structure during transportation. Hereby is obtained that the drive train is securely suspended within the frame structure and thereby safely within the shipping freight container during transportation while being capable of being moved somewhat relative to the frame structure thereby making the attachment and connection to the main bearing system easier and faster.

In an embodiment, the drive train system is suspended in the second frame structure by suspension means configured for movement of the drive train system relative to the second frame structure during assembly of the nacelle. This similarly allows for an easier attachment of the drive train system to the main bearing system in the first nacelle module and for an easier alignment or attachment of the second frame structure to the first frame structure when the drive train system has been attached to the main bearing system.

The mounted nacelle may according to a further embodiment comprise a cover attached to at least the first and the second frame structures. The cover may comprise panels or tarpaulin or combinations hereof. The frame structures forms a firm structure for attaching of the cover which in itself need not be able to withstand any loads other than the loads from the wind and general weather conditions. The cover therefore may be formed from a relatively lightweight material and may simply be stretched over or fixed taut across the frame structures.

In an embodiment the first and/or the second frame structures have a height of 2.591 m or 2.896 m, a width of 2.438 m, and a length of any of 6.058 m, 12.192 m, or 13.716 m. Hereby the first and second frame structures have outer dimensions corresponding to standardized 20', 40', 40' high-cube, or 45' high-cube freight containers according to the ISO standard of ISO 668:2013 for series 1 freight containers. This allows the first and second nacelle modules to be handled, transported, and stacked as standardized intermodal containers and by means of the wide variety of handling equipment designed with the intermodality in mind such as container gantry cranes, straddle carriers, grappler lift, reach stackers, sidelifters, forklift trucks, and flatbed trucks.

BRIEF DESCRIPTION OF THE DRAWINGS

In the following different embodiments of the invention will be described with reference to the drawings, wherein.

DETAILED DESCRIPTION OF THE DRAWINGS

Figure 1:
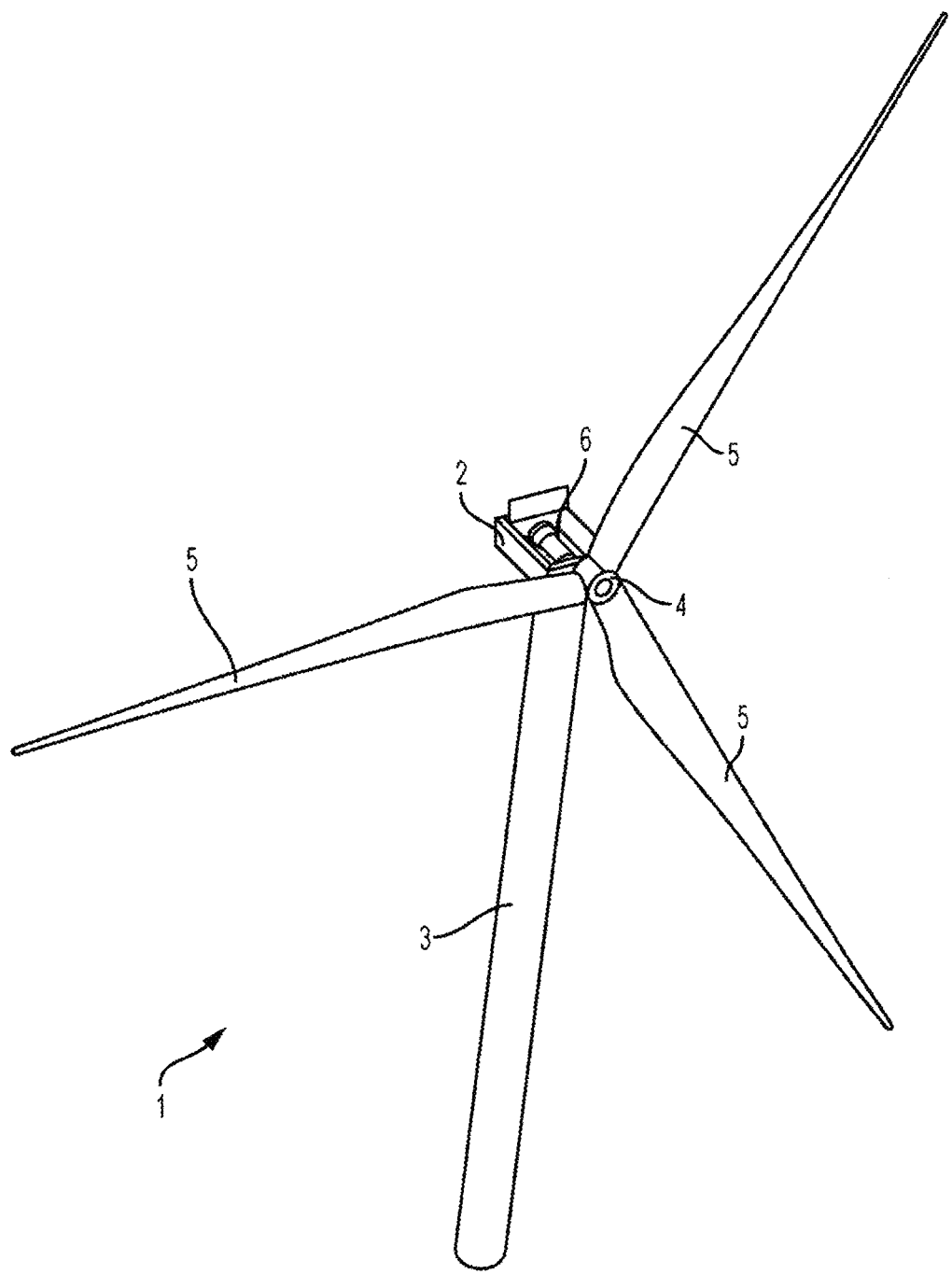
FIG. 1 is a perspective view of a wind turbine having a nacelle according to an embodiment of the invention mounted at a tower thereof.

FIG. 1 shows a perspective view of a wind turbine 1 having a nacelle 2 according to an embodiment of the invention mounted on a tower 3 thereof. A hub 4 carrying three rotor blades 5 forms the rotor assembly and is mounted at the nacelle 2. A top part of the nacelle 2 has been removed for the sake of clarity, thereby revealing the interior parts of the nacelle 2. Inside the nacelle 2 is placed the different wind turbine components such as a drive train system 6. The nacelle 2 is described in further detail below with reference to FIGS. 2-6.

Figure 2:
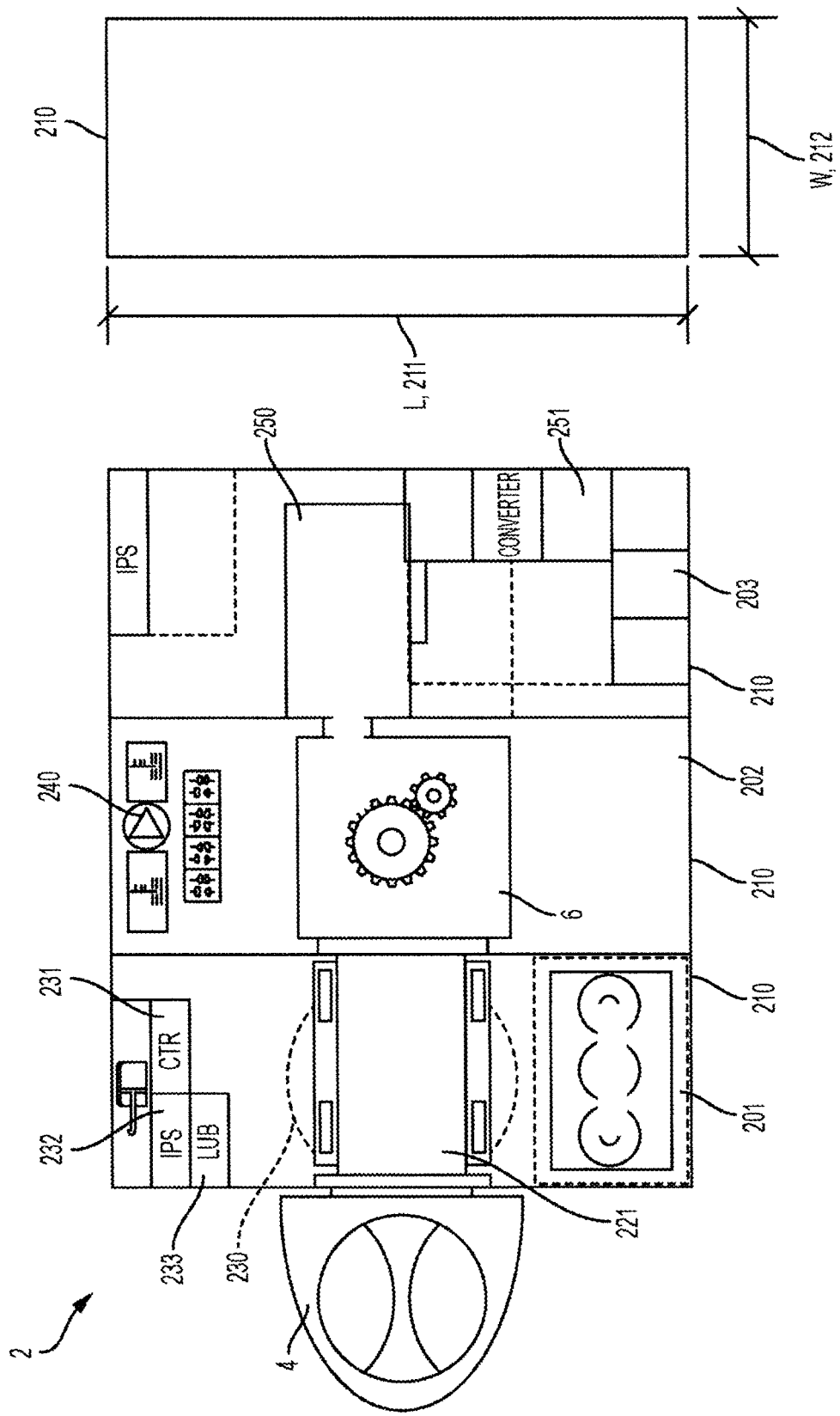
FIG. 2 shows a top view of a wind turbine nacelle as assembled according to an embodiment of the invention and a top view of the frame structure of one of the nacelle modules.

FIG. 2 shows to the left a top view of a wind turbine nacelle 2 as assembled according to an embodiment of the invention, and to the right a top view of the frame structure 210 of one of the nacelle modules. The nacelle comprises a first 201, a second 202, and a third 203 nacelle module each comprising a frame structure 210. In this embodiment, the first, second and third frame structures 210 are placed side by side and corner to corner in a direction along the rotational axis of the wind turbine rotor and oriented with their length L, 211 transversely to the rotational axis. The three frame structures 210 here have the same length L, 211, width W, 212, and height H, 213.

The nacelle modules each comprise different wind turbine components. The first nacelle module 201 comprises a main bearing system 221 for a main shaft of the rotor assembly 4, and the second nacelle module comprises a drive train system 6 attached to the main bearing system 221. The drive train is mounted in the nacelle such that the weight of the drive train system is transferred to the main bearing system and thereby to the wind turbine tower, and the main bearing system is supported by the wind turbine tower. The wind turbine tower 3 is not shown in FIG. 2, but the yawing arrangement 230 also being a part of the first nacelle module 201 is indicated by the dashed lines. The first nacelle module 201 here further comprises a controller 231, a power supply 232, and a lubrication system 233. The second nacelle module 202 comprises a cooling system 240, and the third nacelle module comprises a generator 250 and a converter 251. The generator 250 is connected to the drive train system 6 when the nacelle is assembled.

During transportation and prior to mounting of the nacelle each of the three frame structures 210 are configured to support the wind turbine components placed within them. Further, the first, second, and third frame structures 210 each form a load carrying structure of a shipping freight container. In this way each of the nacelle modules can be transported and handled as shipping freight containers. Each of the three frame structures in the nacelle of FIG. 3 have outer dimensions, i.e. length L, 211, width W, 212, and height H, 213 of a 20' shipping freight container of 6.058 m, 2.438 m, and 2.591 m, respectively.

Figure 3:
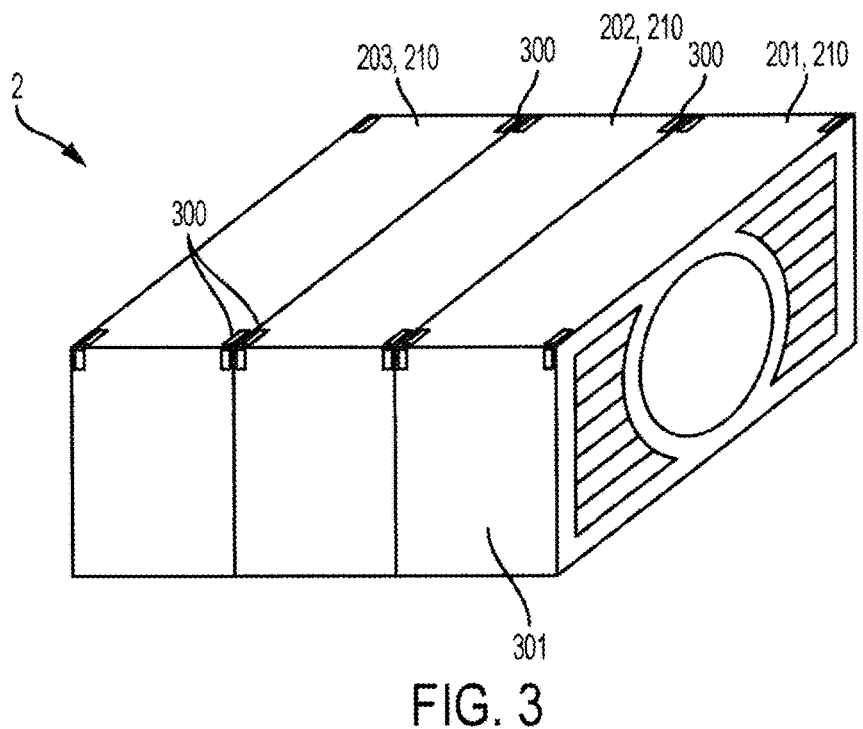
FIG. 3 shows a sketch of the assembled wind turbine nacelle of FIG. 2 in a perspective view.

FIG. 3 shows a sketch of the assembled wind turbine nacelle 2 of FIG. 2 in a perspective view. Here the three frame structures 210 of the nacelle modules 201, 202, 203 are connected at least in the corners 300 as indicated in the figure. The assembled nacelle 2 comprises a cover 301 attached at least to the sides of the assembled nacelles and wherein the frame structures are used for attachment of the cover 301.

Figure 4:
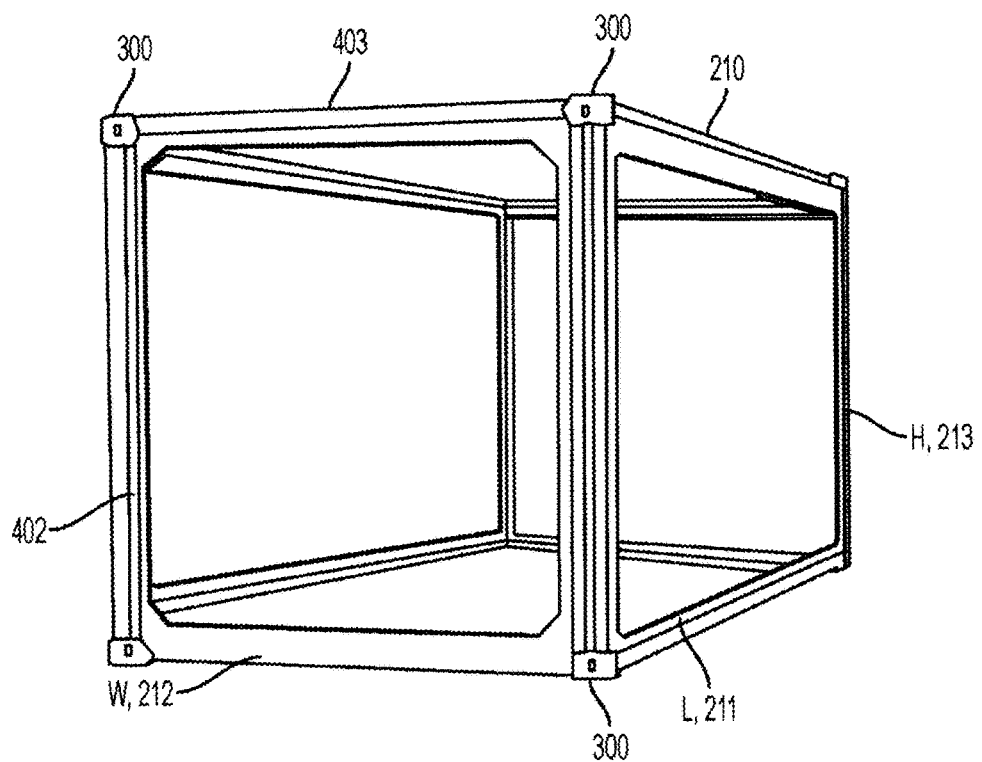
FIG. 4 shows an embodiment of a frame structure of a nacelle module according to an embodiment of the invention.

FIG. 4 shows in a perspective view an embodiment of a frame structure 210 of a nacelle module 201, 202, 203 according to an embodiment of the invention. The frame structure 210 here is a box-like structure and forms the load carrying structure of a shipping freight container. The frame structure comprises four bottom rails 401, four corner posts 402, and four top rails 403 connected in eight corner fittings 300. The frame structures 210 may further comprise a bed plate and cross members or struts to increase the stability and the strength of the frame structure.

Figure 5:
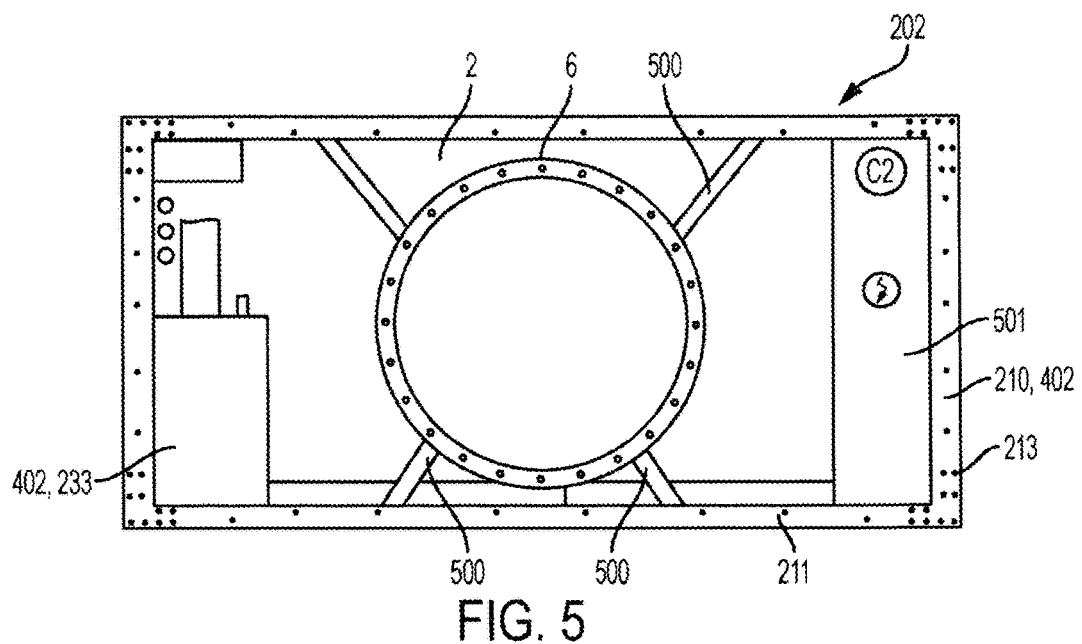
FIG. 5 shows an embodiment of a second nacelle module as seen from a side.

FIG. 5 shows an embodiment of the second nacelle module 202 as seen from a side and along the rotational axis of the wind turbine. The second nacelle module 202 comprises a frame structure 210 and the drive train system 6 which is placed such as to be supported by the frame structure 210 during the transportation and prior to assembly of the nacelle. The drive train system 6 is here suspended by means of a number of struts 500 connecting the drive train system 6 to the frame structure 210. The drive train system may also be placed and supported by bottom rails or a bed plate (not shown) of the frame structure. The nacelle module 202 may also comprise further wind turbine components 501 such as a lubrication system 233. These components are likewise supported by the frame structure during transportation for example by being attached or mounted onto one or more of the corner posts 402 or to a bottom rail or a bed plate of the frame structure. When assembled, the drive train system 6 is attached to the main bearing system of the first nacelle module. The support of the drive train by the frame structure may then be partly detached or loosened. Alternatively or additionally the load transfer may be shifted such that the frame structure is partly or completely supported by and hanging on the drive train system when the nacelle is assembled. The same applies for the main bearing system in the first nacelle module.

Figure 6:
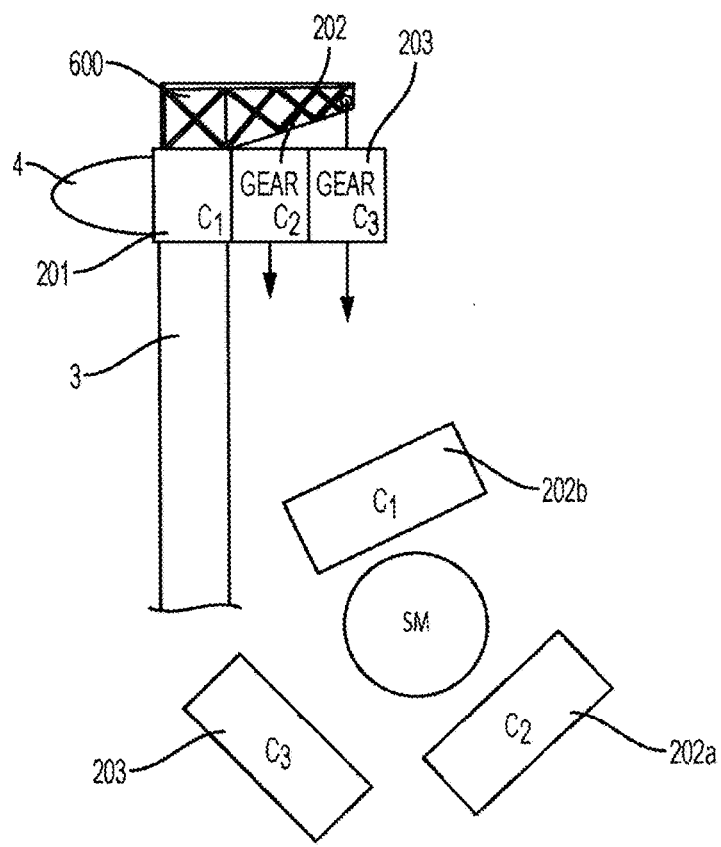
FIG. 6 is a sketch of the exchange of a nacelle module of wind turbine nacelle according to an embodiment of the invention.

FIG. 6 is a sketch of how one or more nacelle modules 202, 203 may be lowered down to the ground for repair or exchange by means of a crane 600 which in this example is mounted on top of the wind turbine tower 3 or on top of the first nacelle module 201. The crane could likewise be a stand-alone crane. The sketches in FIG. 6 outline the method both as seen from the side and as seen from above. If for example the gear system is to be exchanged, this may be obtained by lowering first the third 203 and then the second nacelle module 202a to the ground. The wind turbine may advantageously be yawed in between the operations to thereby place the nacelle modules at different positions around the tower 3. The frame structure of each nacelle module forming a load carrying structure of a shipping freight container then advantageously comprises the strength for the hoisting operations. A new second nacelle module 202b with a new gear system can then be lifted and mounted to the first nacelle module 201, followed by the third nacelle module 203.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A wind turbine nacelle configured for mounting on a wind turbine tower and for supporting a rotor assembly,
    the nacelle comprising at least a first and a second nacelle module,
    the first nacelle module comprising a first frame structure and a main bearing system for a main shaft of the rotor assembly, and
    the second nacelle module comprising a second frame structure and a drive train system for the wind turbine,
    wherein, when the nacelle is mounted on the wind turbine tower, the main bearing system is supported by the wind turbine tower, and the drive train system is attached to the main bearing such that the weight of the drive train system is transferred to the main bearing system and thereby to the wind turbine tower,
    wherein the first frame structure is configured to support the main bearing system during transportation and prior to mounting of the nacelle, and
    wherein the second frame structure is configured to support the drive train system during transportation and prior to mounting of the nacelle, and
    wherein the first and second frame structures form a load carrying structure of a first and a second shipping freight container such that the first and second nacelle module can be transported as shipping freight containers.

2. The wind turbine nacelle according to claim 1, wherein, when the nacelle is mounted on the wind turbine tower, the first and second frame structures are placed side by side in a direction along a rotational axis of the wind turbine rotor.

3. The wind turbine nacelle according to claim 1, wherein the first and second frame structures are oriented such as to have a length extending transversely to a rotational axis of the wind turbine rotor when the nacelle is mounted on the wind turbine tower.

4. The wind turbine nacelle according to claim 1, wherein the first frame structure has a length, a width, and a height, and the second frame structure has the same length and height as the first frame structure, and wherein the first frame structure and the second frame structure are placed corner to corner in the nacelle when mounted on the wind turbine tower.

5. The wind turbine nacelle according to claim 1, wherein, when the nacelle is mounted on the wind turbine tower, the second frame structure is attached to and supported by the first frame structure, and wherein the first frame structure is supported by the tower.

6. The wind turbine nacelle according to claim 1, wherein the first nacelle module is placed in between the rotor assembly and the second nacelle module.

7. The wind turbine nacelle according to claim 1, wherein the second nacelle module is placed in between the rotor assembly and the first nacelle module.

8. The wind turbine nacelle according to claim 1, further comprising a third nacelle module comprising a third frame structure, which is placed side by side to the first or the second frame structure when the nacelle is mounted on the wind turbine tower.

9. The wind turbine nacelle according to claim 8, where the third frame structure is placed side by side to the second frame structure in a direction along the rotational axis of the wind turbine rotor when the nacelle is mounted on the wind turbine tower.

10. The wind turbine nacelle according to claim 8, wherein the third frame structure is configured to support a generator during transportation and prior to mounting of the nacelle, and wherein the generator, when the nacelle is mounted on the wind turbine tower, is attached to the drive train system such that the weight of the generator is transferred to the drive train system and to the main bearing system and thereby to the wind turbine tower.

11. The wind turbine nacelle according to claim 8, wherein the third frame structure has a length smaller than the length of the first or the second frame structures.

12. The wind turbine nacelle according to claim 1, wherein the first nacelle module further comprises at least a part of a yawing arrangement which is supported by the first frame structure during transportation and prior to mounting of the nacelle, and where the yawing arrangement part is supported by the wind turbine tower when the nacelle is mounted on the wind turbine tower.

13. The wind turbine nacelle according to claim 1, wherein the first nacelle module further comprises a bed plate which is supported by the first frame structure during transportation and prior to mounting of the nacelle, and where the bed plate is supported by the wind turbine tower when the nacelle is mounted on the wind turbine tower.

14. The wind turbine nacelle according to claim 13, wherein the first nacelle module comprises further wind turbine components such as a lubrication system or a control system mounted on the bed plate.

15. The wind turbine nacelle according to claim 1, wherein the drive train system is resiliently suspended in the second frame structure during transportation.

16. The wind turbine nacelle according to claim 1, wherein the drive train system is suspended in the second frame structure by suspension means configured for movement of the drive train system relative to the second frame structure during assembly of the nacelle.

17. The wind turbine nacelle according to claim 1, wherein the mounted nacelle further comprises a cover attached to at least the first and the second frame structures.

18. The wind turbine nacelle according to claim 1, wherein the first and/or the second frame structures have a height of 2.591 m or 2.896 m, a width of 2.438 m, and a length of any of 6.058 m, 12.192 m, or 13.716 m.

* * * * *